United States Patent [19]

Sander et al.

[11] Patent Number: 4,862,761
[45] Date of Patent: Sep. 5, 1989

[54] AUTOMOBILE STEERING ASSEMBLY WITH A TELESCOPIC STEERING COLUMN AND A PULL-AWAY DEVICE FOR THE UPPER STEERING COLUMN PART

[75] Inventors: Bernward Sander; Friedrich Stille, both of Wolfsburg, Fed. Rep. of Germany

[73] Assignee: Volkswagen AG, Wolfsburg, Fed. Rep. of Germany

[21] Appl. No.: 235,945

[22] Filed: Aug. 23, 1988

[30] Foreign Application Priority Data

Sep. 4, 1987 [DE] Fed. Rep. of Germany ....... 3729544

[51] Int. Cl.⁴ ...................... B62D 1/18; G05G 17/00
[52] U.S. Cl. .......................................... 74/492; 74/2; 280/777
[58] Field of Search ........................ 74/2, 492; 280/777

[56] References Cited

U.S. PATENT DOCUMENTS 3,373,630  3/1968  Heurtebise ............................ 74/492
3,791,233  2/1974  Bane ...................................... 74/492
3,949,623  4/1976  Fujiwara et al. ..................... 74/492

FOREIGN PATENT DOCUMENTS 2408174  9/1974  Fed. Rep. of Germany ...... 280/777

Primary Examiner—Allan D. Herrmann
Attorney, Agent, or Firm—Brumbaugh, Graves, Donohue & Raymond

[57] ABSTRACT

In order to produce free space ahead of the driver of an automobile for the braking of said driver caused by a safety belt in case of a crash, the steering wheel together with the upper parts of the steering column and the steering column tube are urged toward a retracted position by a compression spring which is normally retained in compressed condition by a locking latch disposed between the vehicle body and the upper steering column tube. The release of the latch results from displacement of a lower steering column tube part during a crash which, upon such displacement, lifts a locking nose out of a recess in the upper steering colum part.

7 Claims, 1 Drawing Sheet

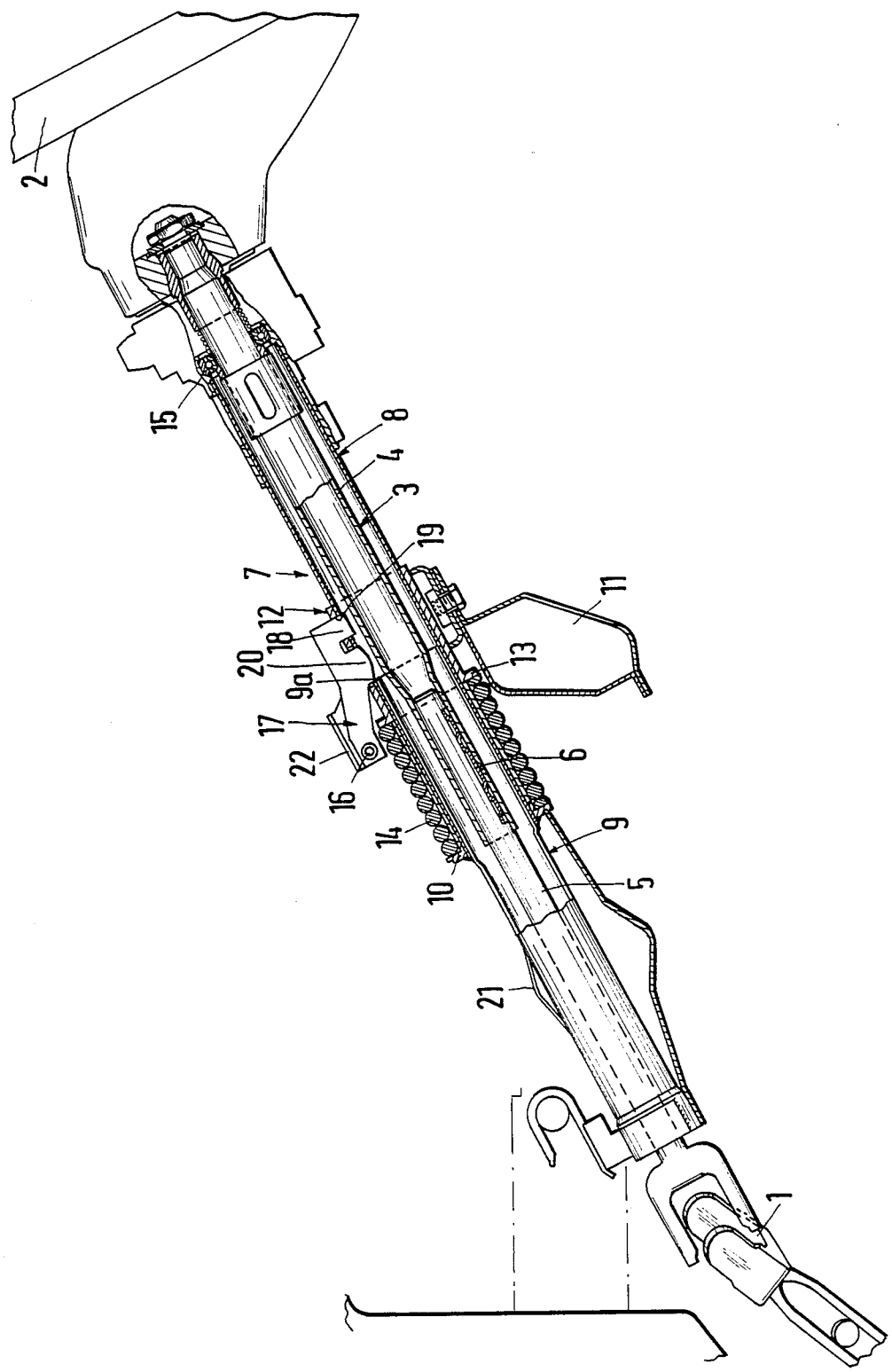

AUTOMOBILE STEERING ASSEMBLY WITH A TELESCOPIC STEERING COLUMN AND A PULL-AWAY DEVICE FOR THE UPPER STEERING COLUMN PART

BACKGROUND OF THE INVENTION

This invention relates to collapsible automobile steering assemblies and, more particularly, to automobile steering assemblies having a spring-biased component.

In modern safety technology directed to the protection of automobile drivers from injuries caused by striking the steering wheel or steering wheel hub in case of a crash, the object, consistent with the legal requirement for drivers to use a safety belt, is to entrust restraint of the forward motion of the driver relative to the vehicle to the safety belt and to create a free space ahead of the driver to accommodate a braking motion of the driver within the seal belt restraint by causing the steering wheel as well as the steering column to retract in the event of a cash. Early examples of this kind of structure are disclosed in U.S. Pat. No. 3,791,233 and in German Offenlegungsschrift No. 24 08 174, which is the starting point of the present invention.

In the steering wheel structure described in the Offenlegungsschrift, a lower steering column tube part bears against the fire wall of the vehicle and an upper steering column part has a lower, piston-like end extending into a cylindrical region of the lower steering column part. A helical spring is arranged to urge the upper part in the direction of further penetration into the lower steering column part. The piston-like portion of the upper steering column part is normally held in place in the lower steering column part by locking pins which are broken by the action of additional forces on the piston-like end which are released by a collision switch at the instant of the crash. As a result, the action of the spring causes a shortening of the steering column together with the desired retraction of the steering wheel away from the driver.

In place of the relatively costly solution utilizing a collision switch, one arrangement described in the Offenlegungsschrift uses the combined inertia of the upper steering column part and the steering wheel to break the shear pins. However, this solution is unreliable since force components transverse to the axis of the steering column occur in a crash because of the inclination of the column and, accordingly, the danger of tilting of the column is present.

Because of the fixed support for the lower parts of the steering column and steering column tube on vehicle elements which are displaced towards the driver in the case of a crash, such vehicles are unable to provide free space to accommodate a braking motion of the driver when the front of the vehicle is deformed in such a manner. Because of the tilting of the column, the full release path of the spring will not be available to increase the distance between the steering wheel and the driver. Instead, the steering wheel retraction is reduced by the length of the displacement of the point of support of the column, in particular of the lower steering column part.

SUMMARY OF THE INVENTION

Accordingly, it is an object of the present invention to provide a new and improved steering assembly for a vehicle which overcomes the above-mentioned disadvantage of the prior art.

Another object of the invention is to provide a vehicle steering wheel assembly which reliably and effectively retracts the steering column and steering wheel in the event of a crash.

A further objection of the invention is to provide a vehicle steering wheel assembly in which such retraction is assured without any additional crash sensors, such as collision switches or inertia-operated locking devices.

These and other objects are attained according to the invention by providing a spring urging an upper steering column part and the steering wheel toward the lower steering column part, a latch for releasably retaining the upper steering column part in an extended condition, and a latch release responsive to collapsing motion of the lower steering column part toward the upper steering column part to release the latch and permit the spring to retract the upper steering column part and the steering wheel toward the lower steering column part. In a preferred embodiment, the latch has a release member projecting into the upper steering column part and the lower steering column part is receivable within the upper steering column part in the event of a crash so as to engage the release member and release the latch.

Thus, if an accident-caused deformation of the vehicle front end displaces the steering mechanism toward the driver, the lower steering column part, which then is likewise displaced toward the driver, will cause a release of the locking of the upper steering column part and thereby of the upper steering column part, so that both parts are moved in the forward direction away from the driver by the released spring.

A further advantage of the invention is that it permits full freedom as regards the construction and support of the steering mechanism. For example, the steering mechanism may be combined with pedals on an assembly support so as to form a prefabricated assembly unit which is then arranged in the vehicle between the A columns.

BRIEF DESCRIPTION OF THE DRAWING

Further objects and advantages of the invention will be apparent from a reading of the following description in conjunction with the accompanying drawing, which is a side view, partly in section, showing a representative steering assembly arranged according to the invention.

DESCRIPTION OF PREFERRED EMBODIMENT

In the typical embodiment of the invention shown in the drawing, a vehicle steering mechanism 1 is connected to a steering wheel 2 by a torque-transmitting steering column 3, which transmits the steering commands imparted by the driver. The steering column includes an upper column part 4 and a lower column part 5 disposed in a telescopic arrangement and yieldingly held in the axial direction by a spring 6. A torque-transmitting connection permitting relative axial motion of the parts 4 and 5, such as a pin and slot connection, is provided in the customary manner.

The steering column 3 is surrounded by a steering column tube 7 which is likewise composed of two telescopic tube parts, i.e., an upper steering column tube part 8 and a lower steering column tube part 9. The lower steering column tube part 9 projects into the interior of the upper steering column tube part 8 and has an end region which is somewhat convergent, at least locally at the edge 9a.

A spring seat 10 is provided at the bottom end, as viewed in the drawing, of the upper steering column tube part 8 and a support part 11 of the vehicle has a mounting 12 formed at its left end, as view in the drawing, with an opposed spring seat 13. A compression spring 14 compressed between the spring seats 10 and 13 urges the upper steering column tube part 8, along with the upper steering column part 4 which is connected with the part 8 by a ring 15, toward the left as viewed in the drawing, i.e., away from the driver.

During the normal driving operation of the vehicle, the spring 14 is prevented from expanding in this manner by a locking latch 17, pivotally supported on the vehicle body, which has a locking nose 18 engaged in a recess 19 of the upper steering column tube part 8, preventing motion thereof towards the left as seen in the drawing. The locking latch 17 is provided with a release nose 20 which has a sloping or rounded inner surface on the side facing the upper edge 9a of the lower steering column tube part 9. The release nose 20 is arranged so that, when the lower steering column tube part 9 moves in the direction towards the right as shown in the drawing, the edge 9a can easily push the release nose 20 radially outwardly, disengaging the locking nose 18 from the recess 19.

Such movement of the lower steering column tube part 9 occurs in a crash which causes a deformation of the front end of the vehicle and thereby a displacement of the steering mechanism 1 or other elements backwards, i.e., to the right as viewed in the drawing. In such a crash, the edge 9a of the steering column tube part 9 which is shifted to the right pushes the locking latch 17 out of its locking position shown in the drawing, so that the locking nose 18 frees the upper steering column tube part 8. As a result, the compression spring 14 urges the spring seats 10 and 13 apart, causing the upper steering column tube part 8, together with the steering wheel 2 and the steering column part 4, to move to the left. Accordingly, the steering wheel 2 is retracted away from the body of the driver by a distance corresponding to the expansion of the spring 14 in the relaxed position.

The retracting movement occurs practically unobstructed, in spite of the presence of a deformation element 21 which engages the spring pad 10, because the deformation element is designed as a buckling element.

It is obvious that the steering assembly may be varied and complemented in many ways. For example, the locking latch 17 may be protected by a cover 22 to prevent inadvertent release of the latch and it may be held by spring force in the locking position shown in the drawing.

Thus, the invention provides a spring-biased retractable automobile steering assembly which causes, in a simple and effective manner, the retraction of the steering wheel in case of a crash to provide room for braking of the inertial motion of the driver due to a safety belt.

Although the invention has been described herein with reference to a specific embodiment, many modifications and variations of the invention will readily occur to those skilled in the art. Accordingly, all such variations and modifications are included within the intended scope of the invention.

We claim:

1. An automobile steering assembly comprising a telescopic steering column including an upper steering column part which carries a steering wheel and a lower steering column part in torque-transmitting relation to the upper steering column part, a telescopic steering column tube surrounding the steering column and including an outer upper steering column tube part and an inner lower steering column tube part, retracting means for the upper steering column part and the upper steering column tube part comprising spring means urging the upper steering column part and the upper steering column tube part in a direction toward the lower steering column part, locking means normally retaining the spring means in stressed condition and adapted to be released in case of a crash comprising at least one locking element engaging the upper steering column tube part and supported on the vehicle and having an actuating member projecting into the path of the lower steering column tube part in case of a crash.

2. An automobile steering assembly according to claim 1 wherein the locking element comprises a pivotable latch which projects into a recess in the upper steering column tube part.

3. An automobile steering assembly according to claim 2 wherein the actuating member passes through a clearance in the upper steering column tube part and has an inclined surface for engagement by an edge of the lower steering column tube part.

4. An automobile steering assembly according to claim 3 wherein the edge of the lower steering column tube part converges inwardly.

5. An automobile steering assembly according to any one of claims 1 to 4 wherein the lower steering column tube part extends to a steering mechanism for the automobile and is surrounded by a buckling element engagable by a spring seating on the upper steering column tube part.

6. An automobile steering assembly according to any one of claims 1 to 4 wherein the spring means comprises a helical spring surrounding a region of the upper steering column tube part.

7. An automobile steering assembly according to claim 6 wherein the helical spring is a compression spring.

* * * * *